July 28, 1959 K. A. HOAGLAND Re. 24,673

ELECTROSTATIC ELECTRON LENS

Original Filed July 3, 1951 4 Sheets-Sheet 1

INVENTOR.
KENNETH A. HOAGLAND

BY Daly & Daly

ATTORNEYS

ELECTROSTATIC ELECTRON LENS

Original Filed July 3, 1951 4 Sheets-Sheet 2

INVENTOR.
KENNETH A. HOAGLAND
BY Darby & Darby
ATTORNEYS

ELECTROSTATIC ELECTRON LENS

Original Filed July 3, 1951 4 Sheets-Sheet 3

INVENTOR.
KENNETH A. HOAGLAND
BY Darby & Darby
ATTORNEYS

ELECTROSTATIC ELECTRON LENS

Original Filed July 3, 1951 4 Sheets-Sheet 4

INVENTOR.
KENNETH A. HOAGLAND
BY Darby & Darby
ATTORNEYS

United States Patent Office

Re. 24,673
Reissued July 28, 1959

24,673

ELECTROSTATIC ELECTRON LENS

Kenneth A. Hoagland, High Crest Lake, N.J., assignor to Allen B. Du Mont Laboratories, Inc., Clifton, N.J., a corporation of Delaware Original No. 2,719,243, dated September 27, 1955, Serial No. 235,010, July 3, 1951. Application for reissue December 7, 1956, Serial No. 627,087

14 Claims. (Cl. 315—16)

Matter enclosed in heavy brackets [ ] appears in the original patent but forms no part of this reissue specification; matter printed in italics indicates the additions made by reissue.

This invention relates to cathode ray tubes and particularly to electrostatically focused cathode ray tubes.

Many electrodes configurations have been devised heretofore to provide electrostatic focusing for the electron beams in cathode ray or other charged particle tubes. One example of such configurations is the so-called unipotential lens commonly used in electrostatically focused television picture tubes. This lens comprises three elements: the tubular second anodes of the electron gun, usually with a limiting aperture and outwardly flared skirt at the forward end thereof; a focusing ring electrode having the same internal diameter as the tubular portion of the second anode; and a second limiting aperture with an outwardly flaring skirt and usually a short tubular section. These electrostatic lenses are designed to focus a beam of electrons in the cathode ray tube when a voltage of approximately 20% of the anode voltage is applied to the focus electrode. Therefore, it is necessary to derive a voltage of approximately 3,000 v. from some point in the television power supply circuit to apply to this electrode for the usual anode voltage of about 15,000 v. Since this voltage must vary proportionately with the variations in the anode voltage, it is common to provide a voltage divider from the anode power supply and connect a tap at the desired voltage level to the focus electrode. However, since it is necessary to vary the voltage at the focus electrode within a limited range in order to obtain the best possible focus of the spot, a high voltage potentiometer must be provided which is capable of withstanding potential differences of 5,000 v. or more.

Tubes have also been devised heretofore in which the focusing electrode was connected directly to the cathode of the tube. Such tubes can then focus only if the parts making up the electron lens have the correct size and space relationships, and these tubes have been uneconomical to produce in large quantities because of the many very critical tolerances involved.

One of the objects of this invention is to provide an improved electrostatically focused cathode ray tube.

Other objects are to provide an improved electrostatic electron lens, to combine said lens with other electrodes in an easily manufacturable cathode ray tube, and to provide an electrostatically focused cathode ray tube in which the focal properties are independent of the anode voltage.

Still further objects will be apparent after studying the following specification and drawings in which, Figure 1 shows a cathode ray tube embodying the invention.

Figure 1:
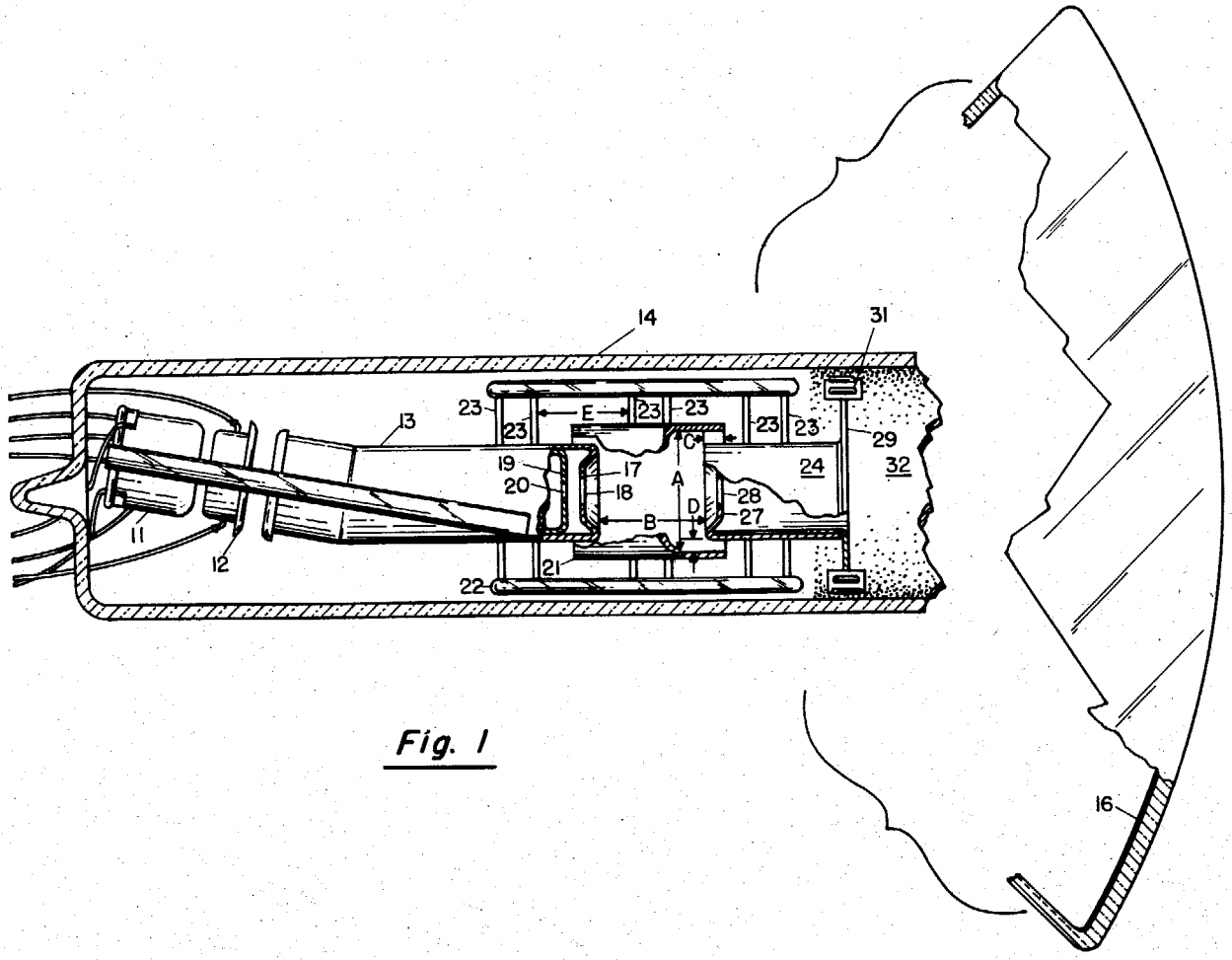

In Figure 1, an electron gun comprising a first grid 11, a second grid 12, and an anode 13 is disposed in the neck of a cathode ray tube 14. The anode 13 in this tube may take the form of the bent anode operating in the manner described in my copending application Serial No. 129,260, or it may take one of a number of alternative forms, as will be described later. The forward end of the anode 13, that is, the end nearest the fluorescent screen or target 16 is covered by a cup-shaped cap 17 which is concave toward the forward end of the tube and contains a central aperture 18. Mounted transversely within the anode 13 is a disc 19 having a central aperture 20 which is preferably somewhat smaller in diameter than the aperture 18.

The tubular electrode 21 coaxial with the forward portion of the anode 13 is rigidly secured thereto by a mounting structure comprising a plurality of support pins 23 having their inner ends welded to the electrodes and their outer ends held by glass rods 22 as described in copending application Serial No. 166,401 to Eric Pohle, assigned to the same assignee. A tubular field-defining electrode 24 electrically connected to anode 13 is similarly secured in axial alignment with the electrode 21 and the forward portion of the anode 13. The end of the electrode 24 facing the anode 13 is covered by a cap or closure member 27 which has a central aperture 28 and is concave toward the rear of the tube 14. The forward end of the electrode 24 is supported within the neck of the tube 14 by a radially extending member 29 with spring clips 31 attached thereto to make electrical and mechanical contact with a conductive coating 32 on the inner wall of the neck of the cathode ray tube 14 as described in copending application Serial No. 200,469 by Herndon W. Leighton, assigned to the same assignee. Other resilient supports may, of course, be substituted, and they need not necessarily be attached to electrode 24.

Figure 2:
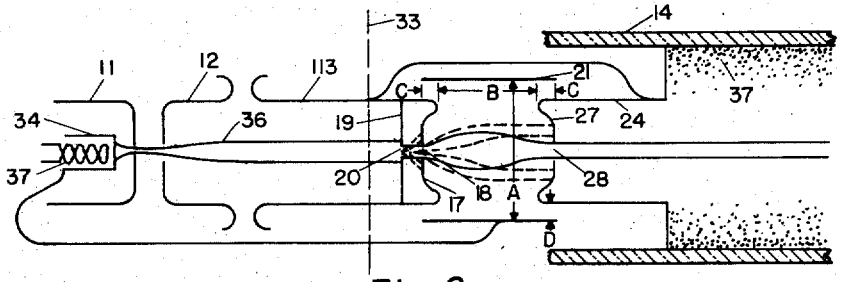
Figure 2 is a simplified version of the tube in Figure 1.

The electrical action of an electron gun similar to the one shown in Figure 1 will be illustrated now with reference to Figure 2. The electron gun shown in Figure 2 is of the so-called straight gun type instead of the so-called bent gun structure shown in Figure 1, and it seems appropriate at this point to call attention to the two sections of the electrode structure as separated by the dotted line 33. To the left of the dotted line is the electron gun structure which may be of any known type such as the straight electron gun shown here or the bent gun of Figure 1 or the well known slashed-field gun, tilted gun, off-set gun, or any combination of these guns which will produce the required beam of electrons. To the right of line 33 is the electrostatic electron lens which forms the subject of this application and may be constructed in any of several forms, examples of which will be described hereinafter. Each of the examples to be described will consist of an anode similar to anode 13 in Figure 1, a focusing electrode 21 having a larger internal diameter than the external diameter of the end of the anode, and a field-defining electrode such as electrode 24 in Figure 1. The anode and the field-defining electrode are electrically connected together and the focusing electrode is directly connected to the constant potential source such as the cathode of the tube. For the purpose of this invention, the voltage on the cathode will be assumed to be constant although in actual practice the video signal may be connected thereto. The complete cathode ray tube may be made up with any of the variations of the electron gun in combination with any of the forms of electrostatic electron lens.

The cathode 34, coaxially mounted within the grid 11, emits a stream of electrons 36 when heated by the heater 37. This stream is prefocused in the manner described in the above-mentioned application Serial No. 129,260 to form a constricted bundle which impinges on the aperture 20 in the disc 19. Not all of the electrons in the beam 36 will pass through the limiting aperture 20; some will strike the periphery and may release secondary electrons therefrom. These secondary electrons follow the dotted curves 38 and, as may be seen, most of these secondaries strike the periphery of the aperture 18 in the cap 17. This aperture 18 is made somewhat larger than the aperture 20 in order that the main bundle of electrons will not be impeded in passing therethrough. Most of the secondaries which escape the periphery of the aperture 18 will be captured by the periphery of the aperture 28 in the field-defining electrode 24.

In accordance with the objects of this invention, the electron lens structure described herein reduces the number of critical dimensional tolerances, the main ones being the diameter A of the electrode 21 and the distance B between electrodes 13 and 24. In Figure 2, the diameter A of the focusing electrode 21 is greater than the diameter of the anode 13 by an amount 2D and the electrode 21 overlaps the electrodes 13 and 24, each by an amount C. It has been found that if C is equal to D, very good focal properties result although other relationships may work equally well. One reason for this is believed to be that the overlap by the electrode 21 excludes stray fields from the electron lens region. Lenses in which the diameters of the anode 13 and the field-defining electrode 24 are .500 in. and A is .625″ and B is .390″ have beeen found to work particularly well although these dimensions are to be taken only as a sample and should not be construed to limit the invention.

Figure 3:
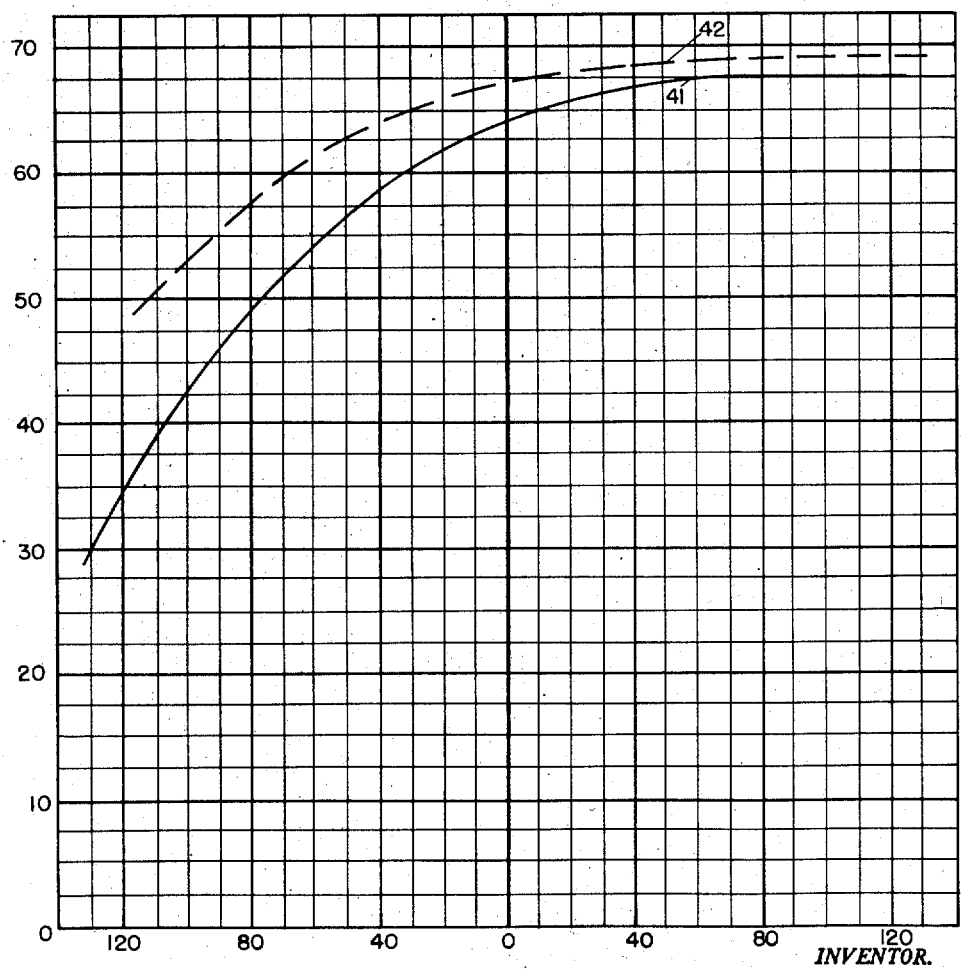
Figure 3 is a graph showing the variation of the focal strength of the electron lens.

A well known formula for determining the focal strength of a uni-potential electron lens such as the one under discussion is $$F=\frac{1}{f}=\frac{1}{8\sqrt{V_0}}\int_{-\infty}^{+\infty}\frac{V'^2}{V^{3/2}}dz$$

in which F is the focal strength, f the focal length, $V_0$ the anode potential, V is the axial potential in the lens region and varies with z, the axial distance, and V′ is the derivative of V with respect to z. A curve of F versus the overlap C has been plotted in Figure 3 to show how the focal strength varies with different amounts of overlap. The curve 41 was obtained by cutting equal amounts off each end of the electrode 21 and making measurements in an electrolytic tank. It will be seen that when the overlap exceeds zero, which is to say as soon as there is any overlap, the curve 41 levels out, and when the overlap exceeds approximately .040″, the focal strength is substantially independent of any further overlap. Below zero, that is, when there is a positive axial distance between a plane passed through the end of the anode 21 and a plane passed through the proximal end of either electrode 13 or electrode 24 (since this positive axial distance will be the same for either), curve 41 starts to drop very rapidly. This is an indication of the critical tolerance of the length of electrode 21, unless there is some overlap.

Curve 42 differs from curve 41 in that the overlap was varied only for one end of electrode 21. This curve was obtained by taking an electrode 21 of fixed length and moving it axially over either electrode 13 or electrode 24. Thus, the overlap was increased for the electrode over which electrode 21 was telescoped and was correspondingly decreased for the other electrode (either 13 or 21). As was seen in curve 41, a large overlap made very little difference so that curve 42 essentially represents the variation of the changing overlap at one end only. In general, the shape of curve 42 is similar to the shape of curve 41, and, as is expected, the focal strength is higher for a given degree of negative overlap than curve 41 due to the asymmetrical form of the electron lens. It should be emphasized that the diameter A of electrode 21 and the spacing B between electrodes 13 and 24 are the principal determinants of the focal strength of the electron lens, but these dimensions may be chosen so that the electron lens will focus at any given distance no matter what the overlap may be, whether positive or negative. Therefore, electron lenses, and even automatically focused lenses, may be designed in which the overlap is negative, but the price which must be paid for such design is an increase in the number of critical tolerances of the various parts.

It will be noted that the electrode 24 is electrically connected to the wall coating 32 of the cathode ray tube, and there is, therefore, substantially no lens action at the plane through the forward end of the anode 24. This anode is necessary in order to define the field in the lens region. Prior art electron lenses have been designed in which the wall coating 32 served as part of the field-defining structure in the lens region. Such tubes are critical as to angular displacement of the electron gun within the neck of the tube, and it is mainly for this reason that the lens-defining electrode 24 has been added. Since this electrode is quite rigidly attached to the anode 13 and the focusing electrode 21, the components defining the electron lens are fixed in their spaced relationships during the manufacture of the gun where tolerances may be easily held to a reasonable amount, instead of being dependent on the alignment of the gun within the neck of the tube where it is extremely difficult to hold close tolerances of alignment. The overlap C enters into this discussion since the electrostatic field of the wall coating is prevented from extending into the lens region partly by this overlap. A negative overlap, i.e. lack of any overlap and axial space between the ends of the electrodes, permits the field of the wall coating 32 to have some effect in the lens region in spite of the field-defining electrode 24 unless some care is taken to keep the coating 32 well away from the lens region. This effect may be prevented by providing long spring fingers (Figure 4) attached to the skirt 29 of the electrode 24 and extending forward to make contact with the end of the wall coating 32 which then may be terminated that much further forward.

The structure shown makes possible another beneficial result in preventing electrical leakage, corona or arc discharge or breakdown between the cylindrical electrodes through a path established on or near the supporting members. Referring to Figure 1, it may be seen that the supporting rods 22 are spaced from the focusing electrode 21 and the two parts of the anode 13 and 24 by a plurality of metal studs 23. The supporting metallic studs 23 making contact with the focusing electrode 21 are placed well toward the center thereof. Similarly, the supporting studs 23 contacting the portions 13 and 24 of the anode are spaced from the ends of the focusing electrode 21. This spacing as illustrated at E together with the stepped arrangement provided by the larger diameter of the focusing electrode 21 as compared with the diameter of the anode 13 and 24 increases the clearances and prevents electrical leakage, corona or arc discharge or breakdown therebetween.

Figure 4:
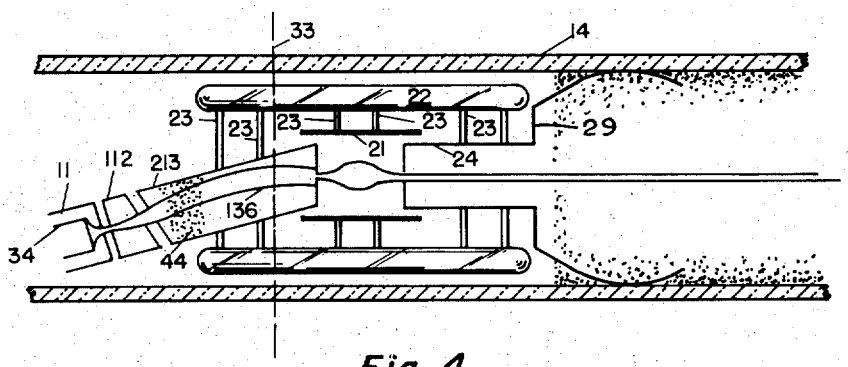
Figures 4 and 5 show different embodiments of the invention.

Figure 4 shows the so-called tilted ion-trap gun comprising the cathode 34, a control grid 11, a second grid 112, and an anode 213. Electrons emitted by the cathode 34 pass through the aperture in the control grid 11 and the second grid 112, are deflected forwardly by the asymmetrical electric field existing between the second grid 112 and the anode 213, and are subsequently deflected by a magnetic field indicated by the dotted region 44. Since the axis of the electron gun is normally at an angle of approximately two or three degrees with respect to the axis of the tube 14 (this small angle is greatly enlarged here for purposes of illustration), the deflection by the magnetic field 44 causes the electron beam 136 to travel substantially along the axis of the tube 14. These electrons then enter the lens region to the right of line 33 substantially in alignment with the axis and subsequent forces on these electrons by the lens structure comprising the focusing electrode 21 and field-defining electrode 24 are as described in connection with Figure 2. The small angle which the electron gun section to the left of line 33 makes with the axis of the lens section to the right of line 33 does not materially alter the focal properties of the lens and hereinafter, in the specification and claims, the term "substantially aligned" will be used to indicate structures such as that in Figure 4 as well as those in Figures 1 and 2.

Figure 5:
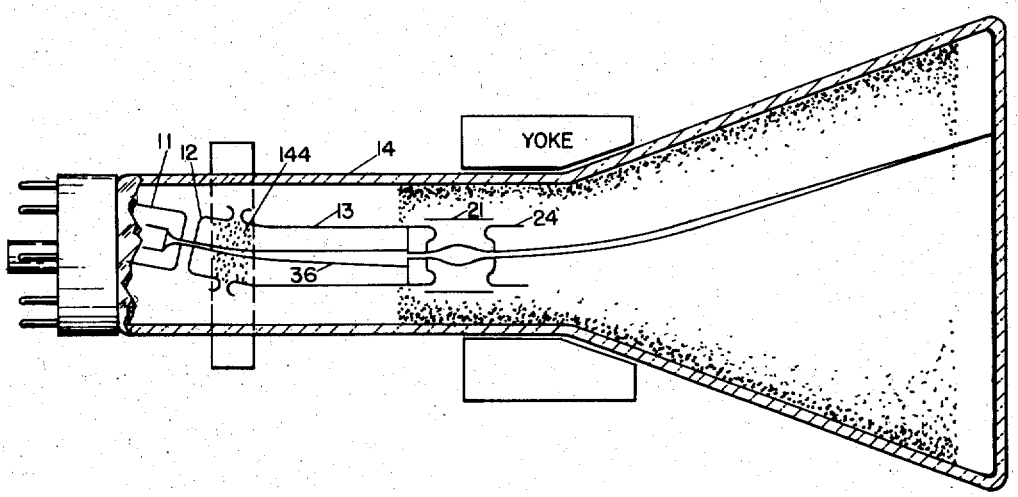

Another modification of the invention is shown in Figure 5. The focus lens axis preferably should coincide with the forward portion of the anode 13 when the bent gun is properly aligned. In practice, however, it sometimes occurs that the control grid 11 and second grid 12, which usually are assembled together prior to the assembly with the anode 13, are displaced with respect to the axis of the rear portion of the anode 13, causing the beam 36 to take a different path through the focusing lens for each variation of the magnetic ion-trap field 144 from the assigned position. In order that the electron beam 36 may pass properly through the focusing lens, it may be necessary to tilt the lens. For example, if grid 11 and second grid 12 are displaced by about 12 mils, a tilt of the entire focus lens assembly of about 1½° is necessary to cause the electron beam to coincide with the axis of the focus lens aperture. Since this small angle is less than the angle of the tilted gun shown in Figure 4, the term "substantially aligned" applies equally to both structures.

Figure 6:
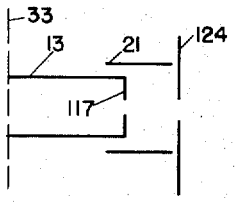
Figure 6 shows a typical embodiment of the electron lens.

Figure 6 shows another modification of the electron lens structure to the right of line 33. Instead of a tubular field-defining electrode, a plane apertured disc 124 may be used. The focusing electrode 21 cannot overlap the disc 124, but since this disc has a large diameter and, as in all other modifications, as illustrated in Figure 2, is directly electrically connected to the anode 13, the field in the lens region will be quite well-defined by the structure, particularly since the overlap is retained at the anode 13 of the focusing electrode 21. By proper design in accordance with well known principles, the apertured cap 117 may be omitted, leaving only the tubular portion of the anode 13.

Figure 7:
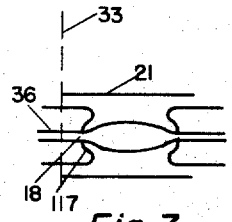
Figures 7 and 8 are different embodiments of the electron lens.

The complete focusing structure shown in Figures 1 and 2 has been found desirable in practice although certain simplifications are possible. Figure 7 shows the same structure without the extra disc 19 and here the aperture 18 in the cap 117 is used as the limiting aperture for the electron beam 36. The structure shown in Figure 7 does not have quite as great reduction of secondary electrons as the structure shown in Figures 1 and 2, unless somewhat greater care is taken in construction thereof.

Figure 8:
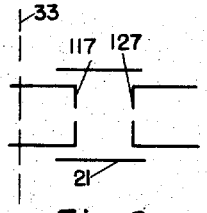

The construction shown in Figure 8 is similar to that shown in Figure 7 except that the caps 117 and 127 are plane instead of dish-shaped.

Figure 9:
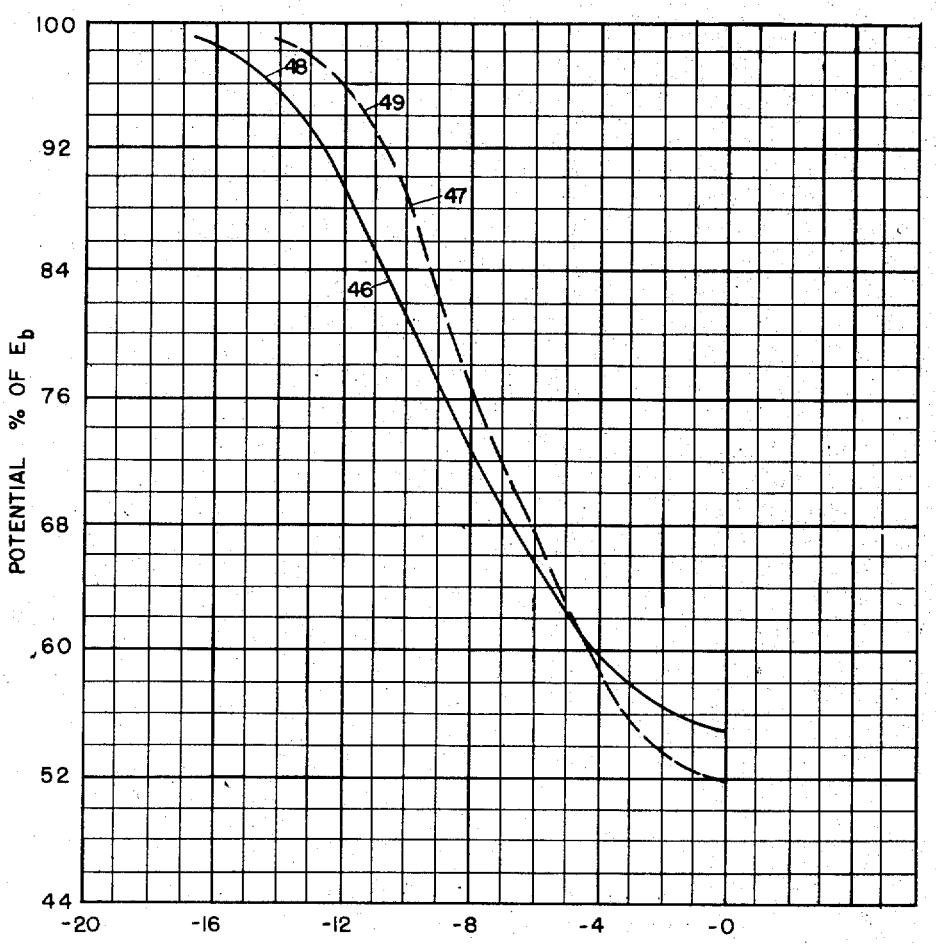
Figure 9 is a graph illustrating the electrical differences between Figures 7 and 8.

Figure 9 shows potential variation curves for the two structures in Figures 7 and 8 in which the spacings have been adjusted so that the focal strength will be the same. The curve 46 may be seen to have a smaller slope in the region of the aperture 18 of Figure 7 than the corresponding slope of curve 47 in the region of the corresponding aperture 118 as indicated at the points 48 and 49 respectively. Thus, the concave construction in Figures 1, 2 and 7 appears to be beneficial in that it removes the apertures from the high gradient fields.

While the focusing electrode is shown connected to the cathode, it may be connected to other sources of potential including those outside the tube.

This invention has been illustrated together with only a few modifications. Other modifications may be apparent to those skilled in the art without departing from the scope of the invention.

What is claimed is:

1. An electron discharge device comprising a bulb having a neck and a target opposite said neck; an electron gun mounted within said neck, said electron gun comprising in order along the path of the electrons, an electron emitting cathode, a control grid, a second grid, a cylindrical anode electrode having a concave apertured closure member at the end distal from said cathode, a cylindrical focusing electrode substantially axially aligned with said anode and overlapping said distal end; a cylindrical field defining electrode having the same diameter as said anode and having a concave apertured closure member at the end facing said anode, and a conductive connection between said anode and said field defining electrode; a conductive coating on the internal wall of said neck, said conductive coating overlapping said field defining electrode; and a conductive connection between said conductive coating and said field defining electrode.

2. The device of claim 1 in which there is an angle between the axis of said cylindrical anode and the axis of said field defining electrode.

3. The device of claim 1 in which said anode has a bend therein.

4. A cathode ray tube comprising a cathode for emitting electrons along an electron beam path; an electron beam focusing lens structure through which said path passes, said structure comprising in order a first tubular anode electrode having a concave apertured closure member at the end remote from said cathode; a second tubular focusing electrode overlapping said remote end of said anode and electrically insulated therefrom; a tubular field defining electrode having an apertured closure member at the end closer to said anode, said focusing electrode also overlapping said end of said field defining electrode; a plurality of structures to support said anode, said focusing electrode, and said field defining electrode in fixed mechanical relation, each of said structures comprising an insulating support rod extending generally parallel to said beam path; a first metal post having one end affixed to said anode and the other end affixed to said rod; a second metal post having one end affixed to said focusing electrode and the other end affixed to said post; and a third metal rod having one end affixed to said field defining electrode and the other end affixed to said rod, each of said posts being so located that the distance along said rod from one post to another is greater than the shortest space path between one of said electrodes and another; and a direct electrical connection within said tube between said anode and said field defining electrode.

5. The device of claim 4 comprising the radially outwardly extending flange at the end of said field defining electrode remote from said anode; and spring support means attached to said flange.

6. The device of claim 4 in which said third tubular electrode has the same diameter as said first tubular electrode.

7. The device of claim 4 in which both said closure members are dishshaped with the concave faces thereof facing each other.

8. An electron lens structure comprising a first tubular electrode; a concave apertured closure member at one end of said electrode; a tubular focusing electrode overlapping said end of said first electrode, insulated therefrom, and substantially aligned therewith; a third tubular electrode substantially aligned with said focusing electrode, insulated therefrom, and having a concave apertured closure member at the end facing said first tubular electrode, said focusing electrode also overlapping said third tubular electrode; and a conductive connection between said first tubular electrode and said third tubular electrode.

9. The electrode structure of claim 8 in which the proximal ends of said first and third tubular electrodes have the same diameter and said second tubular electrode has an internal diameter greater by an amount 2D than the external diameter of said proximal ends, and said focusing electrode overlaps said first and third electrodes each by an amount C where C is at least equal to D.

*10. In a cathode ray tube having a conductive coating on the walls thereof, and a cathode, an electrostatic lens system comprising, in combination, three electrically insulated coaxial electrode members, said members including an intermediate cylinder and a pair of end cylinders, each said end cylinder having a portion received within said intermediate cylinder, a direct electrical connection between said end cylinders, means to electrically connect one of said end cylinders to the coating whereby a potential applied to said coating is present at both said end cylinders, and means to supply a lower potential to said intermediate cylinder to establish an electrostatic field between said intermediate cylinder and each said end cylinder.*

*11. In a cathode ray tube having a conductive coating on the walls thereof and a cathode, an electrostatic lens system comprising, in combination, three electrically insulated coaxial electrode members, said members including an intermediate cylinder and a pair of end cylinders, said end cylinders having a portion received within said intermediate cylinders, a direct electrical connection between said end cylinders, means to electrically connect one of said end cylinders to the coating whereby a potential applied to said coating is present at both said end cylinders, and means to electrically connect said intermediate cylinder to the cathode to apply the same D.C. potential to said cathode as is present at said intermediate cylinder to produce an electrostatic field between said intermediate cylinder and each said end cylinder.*

*12. The combination of claim 11 wherein the received portion of each end cylinder is terminated in an apertured reentrant convex end wall.*

*13. An electron lens structure comprising a first tubular electrode, a concave apertured closure member at one end of said electrode, a second tubular electrode overlapping said end of said first electrode, insulated therefrom, and substantially aligned therewith, a third tubular electrode substantially aligned with said second electrode, insulated therefrom and having a concave apertured closure member at the end facing said first tubular electrode, said second electrode also overlapping said third tubular electrode.*

*14. An electron lens structure comprising a first tubular electrode, a concave apertured closure member at the end of said electrode, a second tubular electrode overlapping said end of said first electrode and being substantially aligned therewith, a third tubular electrode substantially aligned with said first and second tubular electrodes and having a concave apertured closure member at the end facing said first tubular electrode, said second tubular electrode also overlapping said end of said third tubular electrode.*

References Cited in the file of this patent or the original patent

UNITED STATES PATENTS

| | | |
|---|---|---|
| 2,058,914 | Rudenberg | Oct. 27, 1936 |
| 2,070,319 | Rudenberg | Feb. 9, 1937 |
| 2,123,011 | Keyston et al. | July 5, 1938 |
| 2,152,825 | Schlesinger | Apr. 4, 1939 |
| 2,163,210 | Weinecke | June 20, 1939 |
| 2,191,415 | Schlesinger | Feb. 20, 1940 |
| 2,211,613 | Bowie | Aug. 13, 1940 |
| 2,248,558 | Schlesinger | July 8, 1941 |
| 2,277,414 | Ramo | Mar. 24, 1942 |
| 2,363,359 | Ramo | Nov. 21, 1944 |
| 2,389,903 | Hahn | Nov. 27, 1945 |
| 2,452,893 | Bachman | Nov. 2, 1948 |
| 2,452,919 | Gabor | Nov. 2, 1948 |
| 2,454,345 | Rudenberg | Nov. 23, 1948 |
| 2,484,721 | Moss | Oct. 11, 1949 |
| 2,555,850 | Glyptis | June 5, 1951 |
| 2,562,242 | Pohle et al. | July 31, 1951 |
| 2,562,243 | Pohle et al. | July 31, 1951 |
| 2,596,508 | Phillips et al. | May 13, 1952 |
| 2,617,060 | De Gier | Nov. 4, 1952 |
| 2,732,511 | Dichter | Jan. 24, 1956 |

OTHER REFERENCES

Article by Bowie, Proceedings of the Institute of Radio Engineers, pages 1482–1486, vol. 36, No. 12, December 1948.

Industrial Electronics and Control, by R. G. Kloeffler, copyright 1949, published by John W. Wiley & Co., page 453, Fig. 2.